United States Patent [19]

Caillol

[11] 4,105,751
[45] Aug. 8, 1978

[54] PROCESS AND INSTALLATION FOR THE MANUFACTURE OF CHLORINE DIOXIDE

[75] Inventor: Alain Caillol, Paris, France

[73] Assignee: Societe d'Etudes Chimiques, France

[21] Appl. No.: 779,613

[22] Filed: Mar. 21, 1977

[30] Foreign Application Priority Data

Mar. 24, 1976 [FR] France .............................. 76 08479
Mar. 7, 1977 [FR] France .............................. 77 06634

[51] Int. Cl.² .......................................... C01B 11/02
[52] U.S. Cl. ................................... 423/478; 423/479; 423/480; 23/260; 23/282
[58] Field of Search .............. 423/240, 241, 477, 478, 423/479, 481, 486, 488; 23/260, 263, 282

[56] References Cited

U.S. PATENT DOCUMENTS

| | | | |
|---|---|---|---|
| 2,481,241 | 9/1949 | Rapson et al. | 423/241 |
| 2,704,703 | 3/1955 | Hesson | 23/282 |
| 2,881,052 | 4/1959 | Julien et al. | 423/479 |
| 3,322,497 | 5/1967 | Martin | 423/479 |
| 3,806,320 | 4/1974 | Erlenbach et al. | 23/260 |
| 3,816,077 | 6/1974 | Fuller | 23/260 |
| 3,896,213 | 7/1975 | Hirdler | 423/241 |

*Primary Examiner*—Brian Hearn
*Attorney, Agent, or Firm*—Bucknam and Archer

[57] ABSTRACT

Chlorine dioxide is manufactured by reducing an alkali metal chlorate in an acid medium by means of a gaseous or liquid reducing agent in at least one production reactor, with recycling of the tail gases to the said reactor, in order to dilute the chloride dioxide produced. In the new process, the tail gases to be recycled are brought into contact with an excess of reducing agent and a sufficient amount of water to reduce virtually all of the chlorine contained in these tail gases to hydrochloric acid, and thereafter the mixture thus obtained, of tail gases after reduction, and of reducing agent, is recycled, at least partly, to the said reactor. In this way, a large amount of chloride ions, which are immediately available for the basic reaction of production of chlorine dioxide, is introduced at the same time as the neutral gases required for dilution.

30 Claims, 4 Drawing Figures

PROCESS AND INSTALLATION FOR THE MANUFACTURE OF CHLORINE DIOXIDE

The present invention relates to processes and installations for the industrial production of chlorine dioxide $ClO_2$ by reducing a chlorate in an acid medium. In general, the chlorate used in an alkali metal chlorate, especially sodium chlorate. The reducing agent is sulphur dioxide (a gaseous reducing agent) or methanol (a liquid reducing agent) and the acid medium is sulphuric acid.

The overall reaction of the process using sulphur dioxide, which can be written as:

$$2NaClO_3 + SO_2 \rightarrow 2ClO_2 + Na_2SO_4 \qquad (1)$$

is in fact the sum of two reactions, namely:

(a) the reduction of the chlorate by means of sulphur dioxide to give hydrochloric acid, in the presence of water, and (b) the reaction between the hydrochloric acid formed and the chlorate, in an acid medium, to give chlorine dioxide:

$$2HClO_3 + 2HCl \rightarrow 2ClO_2 + Cl_2 + 2H_2O \qquad (2)$$

Equally, the overall reaction of the process using methanol, which can be written:

$$2NaClO_3 + CH_3OH + H_2SO_4 \rightarrow 2ClO_2 + HCHO + Na_2SO_4 + 2H_2O \qquad (3)$$

is in fact the sum of two reactions, namely:

(a) the reduction of the chlorate by methanol to give hydrochloric acid, and (b) the reaction between the hydrochloric acid formed and the chlorate in an acid medium, to give chlorine dioxide, in accordance with reaction (2).

The manufacture of chlorine dioxide by bringing an alkali metal chlorate and a reducing agent into contact is already being carried out in industrial installations for the production of $ClO_2$, employing two reactors. The chlorine dioxide is produced in a main reactor fed, for example, with sodium chlorate, sulphuric acid and sulphur dioxide. Given that $ClO_2$ explodes when it has reached a limiting concentration of 15% and that this dangerous concentration decreases as the temperature rises, it is necessary to introduce, into this main reactor, a large amount of air (or other neutral gases) in order to dilute the $ClO_2$ produced, and it is necessary to regulate the temperature by means of a cooler. The solution issuing from this main reactor is again brought into contact with the reducing agent and the diluting air, in a secondary reactor, in order to reduce its chlorine content, whilst the gases issuing from the main reactor and from the secondary reactor are brought into contact with cold water so as to recover the $ClO_2$ produced, in the form of an aqueous solution. The residual gaseous effluent, referred to as tail gas, still contains traces of $ClO_2$ and a significant concentration of chlorine. Since these two materials are toxic, this gaseous effluent must be treated before being released into the atmosphere, either by absorption in water, which is a difficult process to carry out because of the large amount of diluting air carried with the said effluent, or by absorption by sodium hydroxide solution, which increases the costs through consuming a supplementary reagent.

It has been proposed to overcome this difficulty by employing as the dilution gas in the reactors, not air but the tail gases (principally containing chlorine, traces of $ClO_2$, water vapour and a high proportion of the recycled inert gases), by recycling them so as to dilute the chlorine dioxide produced at the main reactor outlet, in small installations producing at most 20 kg/hour of $ClO_2$, the installations being fed with sodium chlorate, sodium chloride and sulphuric acid.

Furthermore, laboratory experiments have shown the value of recycling the non-absorbed chlorine in the manufacture of $ClO_2$ by bringing a gaseous or liquid reducing agent such as $SO_2$ or methanol into contact with a solution of $NaClO_3 + H_2SO_4$. The recycling would obviously eliminate the problems of the gaseous effluents and furthermore it would allow the recycled dilution gases to become enriched in $ClO_2$. Laboratory experiments, carried out by recycling the tail gases into the main reactor, have shown that the $Cl_2$ content of the recycled gases can reach a concentration of 60 to 95%. However, hitherto no industrial installation has been able to function in accordance with one of the recycling principles presented above. In effect, the recycling of the tail gases directly into the production reactor causes irregularities in running, resulting in a lowering of yield and causing explosions.

The present invention makes it possible to overcome these disadvantages.

Accordingly, the present invention relates to a process for the manufacture of chlorine dioxide by:

reducing an alkali metal chlorate in an acid medium by means of a gaseous or liquid reducing agent, in at least one production reactor, separating the chlorine dioxide produced from the gaseous effluent issuing from the said production reactor by absorption by means of cooled water in a packed column, and recycling the gaseous effluent, referred to as "tail gas", issuing from the absorption column, to the said production reactor, in order to dilute the chlorine dioxide produced, in which process the tail gases are first reduced, before recycling them, by bringing the said gases into contact with an excess of the gaseous or liquid reducing agent, in the presence of water, in an auxiliary reduction reactor, so as to convert virtually all the chlorine contained in these tail gases to hydrochloric acid in accordance with the reaction:

$$SO_2 + Cl_2 + 2H_2O \rightarrow 2HCl + H_2SO_4 \qquad (4)$$

Thus, according to the invention, there is introduced into the production reactor, at the same time as the neutral gases required to dilute the chlorine dioxide produced, a relatively large amount of chloride ions in the form of hydrochloric acid immediately available for the basic reaction of the production of chlorine dioxide:

$$2HCl + 2HClO_3 \rightarrow 2ClO_2 + Cl_2 + 2H_2O \qquad (2)$$

The direction addition of chloride ions, in the form of hydrochloric acid, into the conventional process using sulphur dioxide or using methanol, thus makes it possible to improve the yield of the chlorine dioxide production installation which employs this process and furthermore to achieve important economies in chemical reagents, given that:

on the one hand, one of the essential reagent (HCl) is recovered from the tail gases of the installation and on the other hand, the direct reduction of the chlorate by means of the sulphur dioxide or methanol reducing agent, to give the chloride required for the basic reaction (2) in the conventional process using sulphur dioxide or methanol, which reduction manifests itself in a substantial consumption of chlorate reagent, is eliminated and would only possibly occur in a case where there is insufficient chloride ion present for the reaction (2) to take place normally.

More particularly, the process according to the invention comprises the following stages:

(a) a so-called reduction stage, in which the tail gases to be recycled, containing, inter alia, chlorine, are brought into contact with an excess of a gaseous or liquid reducing agent and a defined amount of water in an auxiliary reactor, so as to reduce virtually the whole of this chlorine to hydrochloric acid in acordance with the following reaction:

$$Cl_2 + 2e \rightarrow 2Cl^-$$

or $$Cl_2 + SO_2 + 2H_2O \rightarrow 2HCl + H_2SO_4 \qquad (4)$$

(b) a so-called $ClO_2$ production stage, in which the reduced tail gases issuing from stage (a) (and containing hydrochloric acid and excess reducing agent) are largely recycled into a main production reactor, where they are brought into contact with an alkali metal chlorate solution in an acid medium, so as to produce $ClO_2$ according to the reaction:

$$2HClO_3 + 2HCl \rightarrow 2ClO_2 + Cl_2 + 2H_2O \qquad (2)$$

(c) a so-called dechlorination stage, in which a small part of the reduced tail gases issuing from stage (a) is recycled into a secondary reactor where it is brought into contact with the liquid effluent issuing from stage (b), so as to lower the content of the element chlorine in the said liquid effluent, in all its forms (chlorine, dissolved $ClO_2$, chloride, chlorate and so on); this amount of reduced tail gases issuing from stage (a) and recycled into the secondary reactor is fixed by analysis of the liquid effluent issuing from stage (c): the concentrations of chloride and chlorate in this effluent make it possible to determine the amount of reducing agent required to achieve a chloride-chlorate equilibrium, in the dechlorination stage, which gives the minimum total chlorine in the liquid effluents which issue. In effect, the reducing agent reduces the chlorate to chloride, which thereafter reacts with the chlorate, producing the gases $ClO_2$, $Cl_2$ and HCl, which escape from the solution;

(d) a so-called $ClO_2$ absorption stage, in which the gaseous effluent issuing from stage (b), the so-called chlorine dioxide production stage, is brought into contact with water, preferably cooled to a temperature of between 0 and 10° C, in a packed column, in order to dissolve virtually all the chlorine dioxide produced, and only a part of the chlorine which it contains; this $ClO_2$ solution, containing a little chlorine, can be kept substantially at the same temperature in a buffer reservoir before being used, in this form, in the majority of cases;

(e) a so-called recycling stage, in which the tail gases consisting of the gaseous effluent issuing from the $ClO_2$ absorption column of stage (d), optionally combined with the gaseous effluent issuing from stage (c), the so-called dechlorination stage, are passed into a compressor which provides them with the necessary energy for their recycling to stage (a), the so-called reduction stage;

(f) optionally, a so-called gas circuit purging and pressure reduction regulating stage, in which a constant small amount of air or of neutral gases is added, upstream from the compressor, at a flow rate so regulated as to maintain a suitable content of inert gases in the gases issuing from stage (b), in order to ensure the dilution of the $ClO_2$ produced, and in which a small amount of tail gases is drawn from the gas circuit, downstream from the compressor, so as to keep the pressure in the gaseous effluent issuing from stage (b), at a constant value;

(g) finally, optionally, a measuring and regulating stage, in which the composition of the final solution of $ClO_2$ is permanently controlled by a continuous analyser which gives the composition in respect of $ClO_2$ and $Cl_2$, thus making it possible to detect any variation in operation in stages (a), (b) and (d); the temperature and/or water flow rate in the absorption stage (d) can be regulated on the basis of the results of the analysis; the analysis of the liquids issuing from stages (b) and (c) makes it possible to follow the chemical change in the reactors and to adjust the flow rates of reducing agent introduced into the said reactors.

Comparison of the process according to the invention, which has just been described, with known processes, makes it possible to demonstrate the novel characteristics of the invention, especially:

stage (a), which is entirely novel;

stage (b), because its working conditions are altered by the existence of stage (a);

stage (c), not only because its working conditions are altered by the existence of stage (a), but above all because the regulating of the flow rate of reducing agent, in other words of the flow rate of the gaseous effluent issuing from (a) to be passed to (c), makes it posible to minimise the concentration of chloride ions in the liquids effluents issuing from stage (c);

stage (d), because in this stage only the gaseous effluent from stage (b) is treated, whilst in the known processes the gaseous effluents from (b) and from (c) are treated together, which results in the presence of impurities (especially hydrochloric acid) in the chlorine dioxide solution produced;

stage (e), in which it is a mixture of gases originating from (c) and (d) which is compressed, whilst in the known processes all the gas entering the compressor originates from stage (d);

stage (f), which permits uniform functioning of the recycling system and permits a choice of the proportion of gases recycled (for example between 20 and 100% and preferably between 98 and 99.5%);

stage (g), because it makes it possible at all times to follow the composition of the product manufactured and to control the production reaction.

Chlorine dioxide is an oxidizing agent which is being increasingly used for numerous industrial applications, amongst which the bleaching of paper pulps assumes first place, followed by the treatment of textile fibres; it is also used to destroy micro-organisms in the sterilisation of drinking water, the disinfection of spent waters and in other biological or biochemical industries.

However, chlorine dioxide is a difficult product to store and transport; in fact, it is impossible to compress $ClO_2$ gas because it would explode, and its aqueous solutions can only be stored at a low temperature, and are very corrosive. Chlorine dioxide is thus produced in the actual factory in which it is to be used, which increases the number of production units and also the hazards resulting from the toxicity of the chlorine dioxide and of the chlorine obtained as a by-product, and from the explosive properties of chlorine dioxide.

The present invention provides an advantageous solution for the operating safety of chlorine dioxide production units on the actual use site, because it eliminates the problem of the gaseous effluents by recycling the tail gases into the reactors and because it ensures, for the first time, the stable operation of installations producing several tons of $ClO_2$/day, with recycling of the tail gases. Furthermore, the present invention makes it possible to increase the yield of $ClO_2$ by stabilizing the operation of the installation, and improves the purity of the $ClO_2$ solution produced, which is no longer contaminated by the hydrochloric acid issuing from the dechlorination reactor because the gases issuing from the latter are, according to the invention, recycled without passing through the $ClO_2$ absorption column.

The present invention also relates to an installation for carrying out the process for the production of chlorine dioxide according to the invention.

Such an installation comprises:

(1) an auxiliary reactor for carrying out the stage (a) of reducing the tail gases, in which these gases are brought into contact with an excess of reducing agent and a sufficient amount of water, the said auxiliary reactor being equipped with means for feeding it with tail gases, reducing agent and water, (2) a main reactor for carrying out the stage (b) of producing chlorine dioxide, in which a large part of the gaseous effluent issuing from the auxiliary reduction reactor is injected through the bottom and brought into contact with a solution of an alkali metal chlorate in an acid medium, this main reactor possessing:

an alkali metal chlorate solution inlet, an acid inlet and an inlet for the gaseous effluent issuing from the auxiliary reduction reactor, (3) a secondary dechlorination reactor for carrying out the stage (c), in which a defined part of the gaseous effluent issuing from the reduction reactor is injected through the bottom and brought into contact with the liquid effluent issuing from the main reactor, this secondary reactor comprising:

an inlet for the gaseous effluent issuing from the auxiliary reduction reactor, an inlet for the liquid effluent issuing from the main reactor, and an outlet for discharging the residual liquid of the said dechlorination reactor, and an outlet for the residual gases of the said dechlorination reactor, (4) a packed absorption column sprayed with cooled water, for carrying out the stage (d), in which the gaseous effluent issuing from the main reactor is brought into contact with this cooled water, the said column comprising:

an inlet for the gaseous effluent issuing from the main reactor, a cooled water inlet, an outlet for discharging the aqueous chlorine dioxide solution obtained, and an outlet for discharging the non-absorbed residual gases, (5) a circuit for recycling the tail gases, connecting the outlet for the gases of the absorption column and, if appropriate, the outlet for the gases of the secondary dechlorination reactor, to the inlet of a compressor, and the outlet of the said compressor to the inlet of the auxiliary reduction reactor, (6) if appropriate, an inlet valve for a dilution gas, and an automatic outlet valve for tail gases, the valves being provided on the recycling circuit, respectively upstream and downstream from the compressor, this automatic valve being controlled by the pressure of the gases issuing from the main reactor, and (7) if appropriate, analyzers at the outlet of each reactor, and various valves for taking samples.

BRIEF DESCRIPTION OF THE DRAWINGS

Other characteristics and advantages of the invention will be pointed in the following description of examples given by way of explanation, and without implying any limitation, with reference to the attached drawings in which.

Figure 1:
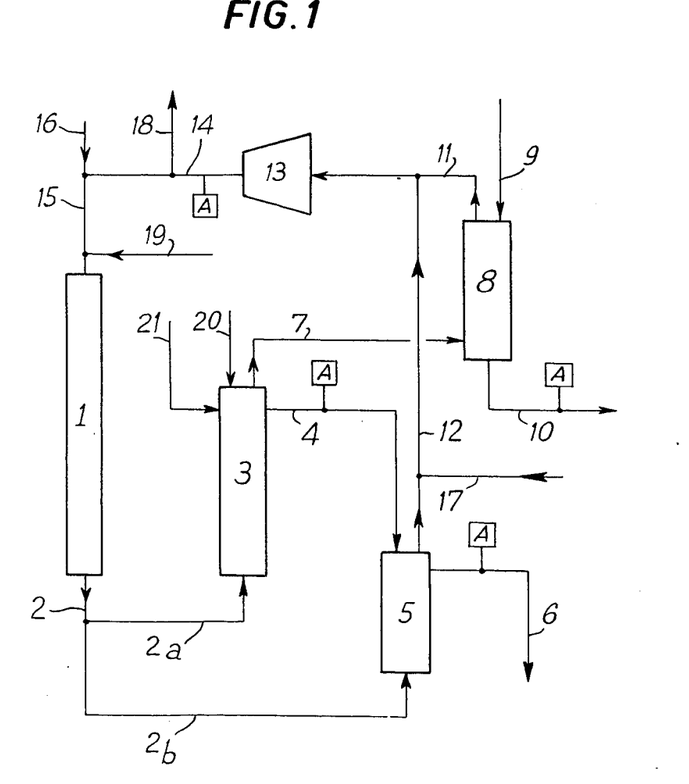
FIG. 1 is a schematic representation of the installation for carrying out the process according to the present invention and FIG. 2 is a more detailed representation of the installation according to the invention for the manufacture of $ClO_2$ from $NaClO_3$, $H_2SO_4$ and $SO_2$, with a production reactor of the air-lift type with recirculation.

If reference is made to FIG. 1 of the drawing, the reduction of the tail gases is effected in an auxiliary reduction reactor 1. The greater part of the gaseous effluent issuing from 1, through the pipeline 2, is injected through the pipeline 2a at the bottom of the main reactor 3, where the oxidation-reduction reactions, leading to the production of chlorine dioxide, takes place. The overflow of the reactor 3 passes through the pipeline 4 into the secondary dechlorination reactor 5 into which is injected, through the bottom, via the pipeline 2b, a metered fraction of the gaseous effluent issuing from 1. The amount of gaseous effluent injected at the bottom of 5 is adjusted on the basis of the analysis of the liquid effluent issuing from 5 through the pipeline 6.

The absorption of the $ClO_2$ contained in the gaseous effluent issuing from the reactor 3 through the pipeline 7 takes place in the packed column 8, sprayed with cold water supplied through the pipeline 9. The aqueous $ClO_2$ solution obtained is analyzed continuously at the outlet 10 of the column. The gaseous effluents issuing from the top of the column through the pipeline 11, are mixed with the gaseous effluents from 5 issuing through the pipeline 12, and returned by the compressor 13 via the pipelines 14 and 15 into the reduction reactor 1, at the same time as the water spray supplied through the pipeline 16. An air inlet 17 is provided upstream from the compressor and an outlet 18 for a part of the gaseous effluent is provided downstream from the compressor. Finally, the installation is controlled by various analysers and samplers designated, in general terms, by A and PE respectively.

The mode of operation of the installation represented in FIG. 1 is described below, using a gaseous reducing agent which is gaseous sulphur dioxide.

The reduction reactor 1 principally makes it possible to carry out the reduction of the chlorine contained in the tail gases by means of the sulphur dioxide supplied through the pipeline 19; these tail gases contain air and/or inert diluents essentially accompanied by $Cl_2$, $ClO_2$, HCl and $H_2O$, the amount of chlorine dioxide being low because it is from 5 to 10 times less than that of the amount of chlorine. A low supply of water can advantageously be sprayed via the pipeline 16 into the stream of gas at the inlet of the reactor 1, so as to be sure that there is sufficient water to ensure the reduction of the chlorine by the $SO_2$. The vaporisation of the sprayed water also serves to cool the gas mixture which has been heated through passing through the compressor 13.

Given that the sulphur dioxide is introduced in excess relative to the $Cl_2$ and to the $ClO_2$ present in the recycled tail gases, it follows that the volume of the reduction reactor 1 is chosen so as to favour the reduction reaction whereby the chlorine present is converted to hydrogen chloride gas according to reaction (4), and so as to minimize the side-reaction whereby the chlorine dioxide produced is destroyed according to reaction (5) which, at the same concentration, is much slower (about 20 times less rapid) than reaction (4):

$$Cl_2 + SO_2 + 2H_2O \rightarrow 2HCl + H_2SO_4 \qquad (4)$$

$$2ClO_2 + 5SO_2 + 6H_2O \rightarrow 2HCl + 5H_2SO_4 \qquad (5)$$

The yield of the installation is thus improved, because a relatively large amount of chloride ions required for the main reaction of producing chlorine dioxide in the reactor 3 is economically provided by the reactor 1 from recycled tail gases, at the same time as a not insignificant amount of $ClO_2$ coming principally from the dechlorination reactor 5.

The reaction whereby chlorine dioxide is produced, which takes place in the reactor 3, is an oxidation-reduction reaction, principally between chloride (supplied through the pipeline 2a) and chlorate (supplied through the pipeline 20) in an acid medium (supplied through the pipeline 21), which reaction furthermore produces a certain quantity of chlorine:

$$2HCl + 2HClO_3 \rightarrow 2ClO_2 + Cl_2 + 2H_2O \qquad (2)$$

The reaction takes place in a 7 N to 11 N, preferably 8 N to 10 N, sulphuric acid medium, with a chlorate concentration of the order of 0.1 to 0.2 M. The temperature in this production stage is maintained at 25°–60° C, preferably at 30°–45° C. The direct reduction of the chlorate by $SO_2$ can be considered as being secondary:

$$2NaClO_3 + 6SO_2 + 6H_2O \rightarrow 2HCl + 5H_2SO_4 + Na_2SO_4 \qquad (6)$$

because it only takes place if there are insufficient chloride ions for the chloride-chlorate reaction (reaction 2) to be able to take place normally; in such a case, the chloride ions will be produced by direct reduction of the chlorate by $SO_2$ (reaction 6), until the concentration of chloride ions again becomes sufficient to maintain the production of $ClO_2$ at the desired level.

The economy in respect of chlorate will be better still if a certain amount of chloride (not exceeding 16% of the chlorate, preferably 6% of the chlorate) is introduced with the chlorate solution into the main reactor 3. Since a part of the $SO_2$ has reacted in the reactor 1, it follows that the risk of an excess of $SO_2$ in the gases produced by the reactor 3 is reduced. In fact, such an excess would be objectionable because $SO_2$, on combining with chlorine in the presence of water, would produce acids (HCl and $H_2SO_4$) capable of contaminating the chlorine dioxide, and could even destroy a part of the $ClO_2$ produced:

$$Cl_2 + SO_2 + 2H_2O \rightarrow 2HCl + H_2SO_4 \qquad (4)$$

$$2ClO_2 + 5SO_2 + 6H_2O \rightarrow 2HCl + 5H_2SO_4 \qquad (5)$$

The rate at which $SO_2$ is introduced thus corresponds to the desired production of $ClO_2$. If a slight irregularity in this rate should arise, the consequences will only manifest themselves gradually, allowing the controller of the installation to react in good time. In fact, the volume of the reactor 3 constitutes a large buffer of reagents, making it possible to produce $ClO_2$ at a capacity close to the nominal capacity for a certain time. It is the periodic analysis of the liquid from the reactor, and the instantaneous analysis of the liquid solution produced, which make it possible to detect this irregularity and hence to correct the incorrect feed rate of reducing agent.

In the reactor 3, the gaseous mixture (gaseous effluent from the reduction reactor 1) introduced at the bottom of the reactor 3 plays a number of roles:

it favours the reaction between liquid reactants and gaseous reactants whereby chlorine dioxide is produced;

it ensures, through a stirring action, a homogenisation of the concentration and temperature of the liquid phase;

finally, it carries the gases produced (principally $ClO_2$) towards the absorption column 8, whilst diluting them (in the case of the dilution with air, $ClO_2$ must not account for more than 14% of the total volume of the gases), in view of the explosion hazards.

The water, cooled to 0°–10° C, preferably to 5° C, introduced through the pipeline 9 at the top of the packed column, circulates in counter-current to the gaseous mixture coming from the reactor 3 via the pipeline 7, and absorbs virtually all the chlorine dioxide produced, as well as a fraction of the chlorine (about 25%). The solution obtained preferably contains 8 g/l of $ClO_2$ and less than 1 g/l of chlorine. The concentration of the solution is in particular regulated through the flow rate of the spray water of the packed column 8.

In the dechlorination reactor 5, the destruction of the chlorate remaining in the liquid effluents issuing from the main reactor 3 is completed by the conjoint action of the mixture of $SO_2$ and tail gases (coming from the reactor 1 via the pipeline 2b) and of the temperature (which does not exceed 80° C and preferably 70°–80° C). This treatment makes it possible to lower the chlorate concentration to 1 g/l and the total concentration of the element chlorine (in the form of chloride + chlorate + dissolved chlorine and dissolved chlorine dioxide) to less than 1 g/l. By extracting this chlorine from the effluents, the re-use of the effluents is facilitated and the yield of the installation is increased by increasing the chlorine and $ClO_2$ content in the gases recycled via the reactor 1.

This result is achieved by bringing about an equilibrium between chloride and chlorate (the concentrations of which vary in opposite senses), and by precise regulating of the amount of $SO_2$ introduced.

The gases which issue from the dechlorination reactor 5 are essentially $Cl_2$ and HCl, with a small amount of $ClO_2$; these gases are mixed with tail gases from the column 8 without passing through the latter, in order to avoid contaminating the chlorine dioxide solution, obtained in this column, with the acid contained in the gaseous effluents of the reactor 5.

The gaseous mixture is then returned to the reactor 1 via the compressor 13.

By way of example, the operating characteristics of an industrial production unit according to the invention are indicated below:

| Production capacity | 3 tonnes/day of $ClO_2$ |
| --- | --- |
| Flow rate of recycled gases | 500 N m$^3$/hour |

(a) Theoretical flow rates of the reactants:

| $NaClO_2$, concentration 625 g/l (with 6% of NaCl) | 342 l/hour |
| --- | --- |
| 98% strength $H_2SO_4$ | 107 l/hour |
| $SO_2$ (T = 70° C, P = 3 bars) | 30 N m$^3$/hour |
| Absorption water (T = 7° C) | 15.7 m$^3$/hour | for a solution containing 8 g of $ClO_2$/l (b) Observed consumptions of chemical products:

| $NaClO_3$ | 1,500 to 1,700 kg/tonne of $ClO_2$ |
| --- | --- |
| NaCl | 90 to 100 kg/tonne of $ClO_2$ |
| $H_2SO_4$ | 1,100 to 1,600 kg/tonne of $ClO_2$ |
| $SO_2$ | 500 to 700 kg/tonne of $ClO_2$ |

(c) Analysis of the $ClO_2$ solution:

| $ClO_2$ | 8.85 g/l |
| --- | --- |
| $Cl_2$ | 0.65 g/l |

(d) Running conditions of the main reactor 3:

| Concentration of $NaClO_3$ | 20 g/l |
| --- | --- |
| Normality of sulphuric acid | 9 N |
| Temperature of the liquid | 36–37° C |
| Temperature of the gases at the outlet | 38° C |

Figure 2:
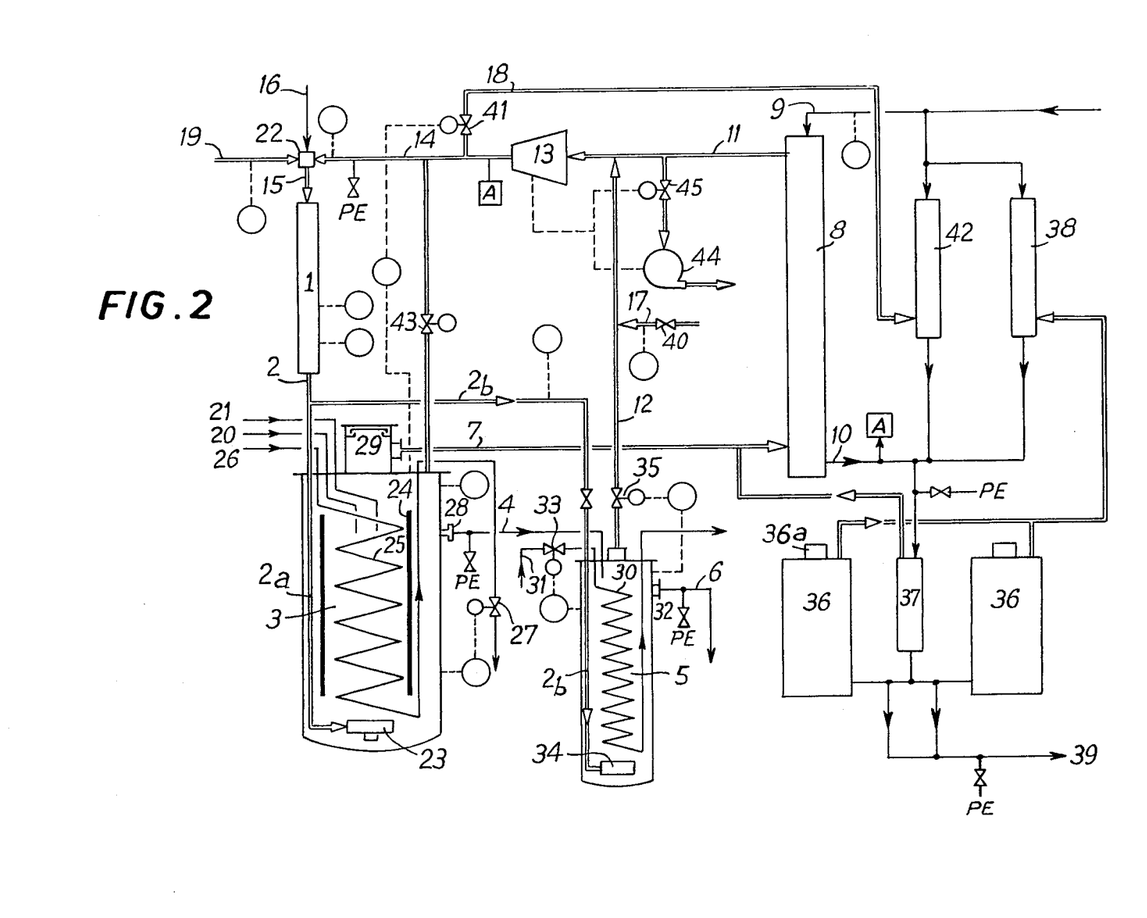

If reference is made to FIG. 2 of the drawing, the sulphur dioxide is introduced in a metered amount, in the gaseous form, free from liquid, and under pressure, by means of the injector 22 which ensures good mixing with the sprayed water supplied through the pipeline 16 and with the recycled tail gases supplied through the pipeline 14, before introduction into the gas-gas reduction reactor 1. The latter consists, in the simplest case, of, for example, an externally cooled length of pipeline, the temperature and the flow rate of the gas mixture introduced being controlled constantly.

The main production reactor 3 is of the "air-lift" type with liquid recirculation. The distribution and dispersion of the gaseous mixture in the liquid mass is achieved by a diffuser 23; this diffuser, located at the bottom of the reactor, can take the form of a cylindrical bell perforated with a large number of orifices of the same diameter over its entire horizontal upper face, or the form of perforated horizontal "gas rings" arranged concentrically, or the form of any other equivalent equipment which makes it possible to ensure as uniform a surface distribution as possible in the section of the reactor 3 which it is desired to stir.

The gases are supplied under pressure to the diffuser 23 via the tubes 2a which dip into the reactor from its upper part. The gases rise to the surface, from the diffuser, in the form of bubbles of small diameter, carrying with them the adjoining mass of liquid as they execute their rising movement.

In order to favour this gas-liquid contact and ensure a high degree of recirculation of the liquid in the vicinity of the diffuser, an advantageous arrangement within the reactor consists of partitioning the reactor into two non-sealed concentric compartments. This separation can be provided by a cylindrical skirt 24 made of titanium, which forms a chimney for the passage of the gas-liquid mixture. This mixture, partially degassed at the upper surface of the reactor, redescends between the skirt and the wall of the reactor and thus contributes to the stirring of the reaction mixture.

The temperature of the liquid mass is regulated, and the heat evolved by the reactor is removed in situ, by means of a titanium coil 25 placed inside the reactor. Through this coil flows a cooling fluid which enters through the pipeline 26, and the flow rate of which is regulated by the automatic valve 27 as a function of the temperature of the reaction liquid. This same device can be used to heat the same liquid, if necessary, for example at the time of starting up the production installation. If the reactor is divided into two compartments, the coil can be divided into two, or can pass successively through the two parts of the reactor, so as to ensure that the temperature of the whole of the reacting liquid is regulated, even if the stirring is stopped.

The reactor is perfectly sealed in its lower part; all the tubes, pipelines and orifices are located above the liquid mass, which reduces the risk of leakage or bursting of the reactor. The body of the reactor can thus be made up of polyester resin reinforced with glass fibre, specially chosen to resist the temperature and corrosive effect of the liquid and gaseous media. The liquid reactants ($NaClO_3$ and $H_2SO_4$) are introduced by means of dip tubes 20 and 21, the level of liquid in the reactor is fixed by an overflow 28, and complete draining is achievable by means of a siphoning system. The concentrations inside the reactor are controlled by taking a sample from the overflow. If necessary, supplementary samples can be taken inside the reactor, by siphoning. A safety valve 29, which can be a valve with a water-tight seal, protects the reactor against excessively high or excessively low pressure (in normal running, the reactor functions under very slightly reduced pressure, the pressure reduction being of the order of from 50 to 100 mm of water column).

Placing a flame barrier at the gas outlet makes it possible both to prevent any propagation of flames outside the reactor and to limit the entrainment of the liquid by the gases (the acid contained in the liquid being able to reduce the purity of the chlorine dioxide solution produced in the absorption column 8).

The dechlorination reactor 5 is of the "air-lift" type but can be simplified compared to the main reactor, by omitting the safety valve and the recirculation system. The coil 30 in this reactor serves to heat the solution and is therefore fed with steam or hot water through the pipeline 31, with a flow rate regulated as a function of the temperature.

The reactor 5 is supplied through the pipeline 4, which comes from the overflow 28 of the main reactor 3. The liquid effluent issues through the overflow 32 and the discharge pipeline 6. Taking a sample at the outlet makes it possible to ascertain the composition of this effluent and hence to regulate the gas flow rate in the reactor 5. In effect, a fraction, which can be regulated by the valve 33 and is of the order of 5%, of the mixture of $SO_2$ and recycling gases, is passed through the pipeline 2b into the diffuser 34 of the reactor 5.

After being measured in a rotameter, the flow rate is regulated by means of the manual valve 33, with the automatic valve 35 located on the gas outlet maintaining a constant pressure inside the reactor. The variations in gas flow rate are sufficiently low not to disturb the running of the main reactor 3. Since the fraction of the gas flow passed into 5 is of the order of 5%, a variation of 20% in this flow will only produce a variation of 1% in the gas flow passed to the diffuser 23.

The gases issuing from the main reactor 3 pass into the column 8 which is packed and is sprayed with water through the pipeline 9. The cooled spraying water both absorbs the chlorine dioxide and cools the gases which will be recycled by the compressor 13, as the passage through the compressor is accompanied by a certain rise in temperature.

The solution of chlorine dioxide obtained at the bottom of the column 8 is controlled by an analyzer A which determines its composition in respect of chlorine dioxide and of chlorine. The solution is passed into the buffer reservoirs 36 through a column 37 which plays the role of a hydraulic safety guard, which isolates the storage from the remainder of the unit. The reservoirs 36 are themselves provided with a hydraulic safety valve 36a, the chlorine dioxide which escapes from the solution inside the reservoirs being recovered by means of a secondary absorption column 38.

The storage reservoirs 36 can continuously supply the user unit (for example a bleaching installation) with chlorine dioxide solution, through the pipeline 39. These storage reservoirs are provided with a cooling device in order to restrict the losses of chlorine dioxide through loss of gas.

The tail gases cooled in the column 8, and mixed with the hot gases coming from 5, are recycled by means of the compressor 13 after introducing, through the valve 40, a very small amount of air or of inert diluting gas, the amount being regulated by means of a flowmeter. The composition of the recycled gaseous mixture can be controlled by taking a sample downstream from the compressor.

The automatic valve 41, controlled by the pressure of the gases in the upper part of the reactor 3, regulates the rate of escape of the recycling gases. A small non-recycled proportion (0.5 to 2%) of the gaseous mixture is passed through the pipeline 18 into a secondary absorption column 42 in order to avoid discharging any polluting gases into the atmosphere.

The solutions issuing from the columns 38 and 42 are mixed with the main chlorine dioxide solution after controlling their composition by taking samples. The flow rate of these columns is sufficiently low (less than 5% of the total flow rate) not to alter significantly the concentration of the $ClO_2$ solution produced.

In addition to the analysers which make it possible to monitor the proper chemical functioning of the installation, various physical parameters are controlled, namely, the temperature of the liquid and of the gases in the reactor 3, the pressure in the reactor 3, the flow rate of spraying water in the absorption column 8 and the absence of liquid sulphur dioxide at the inlet 19 to the gas circuit. These parameters make it possible to detect any anomaly in the operation of the installation. In case of an abrupt variation, indicating a danger of decomposition of the chlorine dioxide, a certain number of safety devices are triggered automatically: the production of chlorine dioxide is stopped rapidly by stopping the stirring of the reactor (the recycling gases being used to flush the upper part of the reactor by means of an automatic valve 43) and by stopping the reactants ($H_2SO_4$, chlorate and $SO_2$). These devices permit rapid restarting when the situation has again become normal, so as to minimise the production loss and the dilution of the stored material.

In case of stoppage of the compressor 13, an auxiliary fan 44 provided with an automatic valve 45 makes it possible to "purge" the gas circuit and thus to avoid any dangerous accumulation of chlorine dioxide in the installation. This purely occasionally used gas purging system is connected to a general gas outlet (chimney or safety column).

The installation shown in FIG. 2 is envisaged for a gaseous reducing agent, but it can easily be adapted to the case of a liquid reducing agent of which the boiling point is not too high, in this case methanol.

Thus, the methanol is introduced into the recycling gases in the form of finely atomised droplets, by means of the atomiser 16. This atomiser 16 furthermore serves to introduce a sufficient flow rate of atomised water. The methanol and the water are thus carried by the gaseous mixture into the reactor 1, where they reduce the chlorine to HCl. The vaporization automatically cools the recycled gases; this process will thus be used preferentially in cases where the gases become strongly heated on passing through the compressor 13, that is to say when the pressure required for the injection of the gases at the bottom of the main reactor is high.

In the preceding text, the main production reactor and the secondary dechlorination reactor are of the continuously fed stirred tank type. Stirring, achieved by bubbling-in of the reduced tail gases, ensures that the liquid mass is very homogeneous. The gases are introduced at the bottom of the reactor by means of porous tubes or of a diffuser, but the gas liquid contact thus achieved is not strictly methodical and it is sometimes difficult to avoid agglomeration of the bubbles in the reactor.

According to a variant of the process of the invention, which makes it possible to deal with these disadvantages and to ensure more efficient functioning of the production installation, a counter-current is set up between the gases and the liquids in the main production reactor and in the secondary dechlorination reactor and the liquid effluent issuing from the bottom of the main reactor is partially recycled to the upper part of the said reactor in order to dilute the reactants introduced at the top of the reactor, if necessary after cooling of the said liquid effluent, and, if appropriate, the gaseous effluent of the secondary dechlorination reactor is partially recycled to the said main reactor, being finely dispersed, at a suitable level to equilibrate the pressures.

The use of counter-current improves the efficiency and the distribution of the gas-liquid mass exchanges, by increasing the concentration gradients which favour these changes (for example for $SO_2$ and sodium chlorate), all the more so because it is combined with technological improvements which ensure the renewal of the contact surfaces and which increase the duration and regularity of these gas-liquid contacts.

However, the counter-current set up is not completely methodical, because the liquid reactant flow rates are too low to ensure suitable spraying in the main reactor and to remove the heat evolved by the reaction when operating on an industrial scale. It is for this reason that, according to a characteristic of the invention, the reactants introduced into the main reactor are diluted to a certain degree by partial recycling of the liquid effluent, issuing from the bottom of the main reactor, to the upper part of the said reactor.

The process according to the invention can be put into operation by using, as production reactors and dechlorination reactors, gas-liquid counter-current reactors of the conventional types, such as columns with perforated plates and weirs, or packed columns (in which the packing can consist of Raschig rings, Berl saddles or Intalox saddles, metal gauze and the like).

According to yet another characteristic of the invention, it is advantageously possible, at the bottom of the main reactor, which employs counter-current with recycling of a part of the reaction liquid, to keep a certain volume of this liquid below the level of introduction of the gases so as to constitute a non-stirred buffer volume, which ensures a certain stability in the change of concentrations of the reactants, by a retention effect, because the volume of liquid containd in a counter-current reactor is lower than that contained in the generally used stirred tank reactors.

The samples of the recycling liquid are taken from this buffer volume, the additional residence time of the solution in the lower part of the reactor allowing the liquid phase reactions to take place more completely.

By way of example, the operating characteristics of a laboratory reactor according to the invention, of the type employing a column with perforated plates and weirs, and direct recycling of the liquid, are indicated below:

column of about 100 mm diameter and about 1.40 m height, three titanium plates perforated with 36 holes of 2 mm diameter, total volume of liquid 8.5 l (of which 2.5 l are below the level of introduction of the gases, and form a buffer volume), dilution gas flow rate 0.5 to 0.8 $Nm^3$/hour, production achieved, 255 g of $ClO_2$/hour, production per unit volume, 30 kg/hour/$m^3$, recycling flow rate of the solution, 10 l/hour, concentration of sodium chlorate varying from about 80 g/l for the solution introduced at the upper plate (containing the fresh reactants) to 15 g/l at the bottom of the reactor.

By way of example, the operating characteristics of a laboratory reactor according to the invention, of the flooded-packing column type, with direct recycling of liquid:

column of about 100 mm diameter and about 1.40 m height, packing to a height of 40 cm with 10 × 10 mm Raschig rings (or titanium gauze), total volume of liquid, 6 l, of which 2.5 l are below the gas introduction level, gas flow rate 0.5 to 0.8 $Nm^3$/hour, production achieved, 210 g of $ClO_2$/hour, production per unit volume, 35 kg/hour/$m^3$, recycling flow rate of the liquid, 10 l/hour.

The packed reactor is a simpler embodiment than the plate reactor, but does not possess the alternation of liquid and gas volumes of the latter. In effect, in a column with plates and weirs, the gas volumes maintained between the level of one weir and the plate of the stage above it, play the role of a second auxiliary reactor for the reduction of the tail gases, and in this case the initial auxiliary reactor for reduction can be reduced to the volume of the gas supply tube system. Though the packed reactor does not achieve the renewal of the surface of the bubbles, which the plate column makes possible, the lengthening of the gas-liquid contact time and the greater dispersion of the gas bubbles achieved in the plate column make it possible substantially to reduce the volume of liquid inside the reactor, but this gain is partly compensated by the additional volume occupied by the packing.

The good distribution of the gas in this type of reactor causes the formation of bubbles of small size, which favour the formation of foams, and this phenomenon becomes accentuated if the reactants contain impurities. It can then become necessary to use anti-foaming products, such as the silicones.

A combination of the two preceding types of reactors can advantageously be used in the form of a column with a smaller number of plates, of which some carry a packing. Preferably, the plates of the bottom of the column are provided with a packing, so as to favour the absorption of the gaseous reducing agent, whilst the upper plates are not provided with a packing, so as to increase the turbulence and favour the degassing of the $ClO_2$. The efficiency of the main reactor for the production of the $ClO_2$, of the counter-current type, comprising a buffer volume of liquid below the introduction of the dilution gases, can be improved, according to another characteristic of the invention, by introducing a part or a whole of the reducing agent (for example the sulphur dioxide) in an undiluted form at the very bottom of the said reactor. This process favours the absorption of the reducing agent by the gradient effect and permits better elimination of the dissolved chlorine, by liquid phase reduction. In the same way, a part of the reducing agent can be introduced in an undiluted form at the bottom of the secondary reactor.

The $ClO_2$ production reaction is thus favoured in the lower volume of the reactor, because the formation of chloride by the chlorine reduction reaction allows the chloride/chlorate reaction to develop. At the same time, the operation of the dechlorination reactor is facilitated through the reduction in the chlorine content of the effluents of the main reactor.

The chlorine dioxide formed is degassed either in the dechlorination reactor or in the main reactor by recycling.

As the flow rate of undiluted reducing agent is low, its absorption will be favoured by using a packing located in the lower volume of the main reactor. This volume, which is only stirred slightly, becomes an important locus for the liquid phase $ClO_2$ production reaction and as a result considerable heat is evolved, which may necessitate an efficient cooling system. Coils can advantageously fulfil the double function of a packing and of cooling.

By way of example, the following results have been obtained in the laboratory:

reactor of the flooded-packed column type, as defined in the preceding example, with titanium gauze packing, and with the whole of the pure sulphur dioxide introduced at the bottom of the reactor, samples taken at the bottom of the reactor:

(a) production 100 g of $ClO_2$/hour, air flow rate 500 Nl/hour, $SO_2$ flow rate 95 g/hour.

|  | Temperature (without cooling) | Dissolved $ClO_2$ + $Cl_2$ (g/l) | $NaClO_3$ (g/l) | Chloride $Cl^-$ (g/l) | Normality of acid |
|---|---|---|---|---|---|
| $SO_2$ mixed with the dilution gases | 38 | 2.5 | 15 | 2.3 | 8.9 N |
| Pure $SO_2$ at the bottom of the reactor | 39 | 2.4 | 11 | 1.7 | 9.3 N |

(b) production 200 g/hour, air flow rate 700 Nl/hour, $SO_2$ flow rate 180 g/hour.

|  | Temperature (without cooling) | Dissolved $ClO_2$ + $Cl_2$ (g/l) | $NaClO_3$ (g/l) | Chloride $Cl^-$ (g/l) | Normality of acid |
|---|---|---|---|---|---|
| $SO_2$ mixed with the dilution air | 41 | 2.3 | 14 | 2.0 | 9.2 N |
| Pure $SO_2$ at the bottom of the reactor | 44 | 3.3 | 12 | 1.8 | 9.35 N |

In the known processes for the manufacture of chlorine dioxide, the gaseous mixture issuing from the dechlorination reactor is mixed with the gases issuing from the main production reactor before passing into the absorption column. Now this gaseous mixture contains hydrogen chloride gas, chlorine and the excess reducing agent, and these can contaminate the $ClO_2$ solution produced. According to a variant of the invention, in order to avoid this contamination, the gases issuing from the dechlorination reactor are recycled directly to the main reactor, at a suitable level for equilibrating the pressures, where they mix with $ClO_2$ dilution gases.

The hydrogen chloride gas will thus be absorbed in the reaction liquid, as will the chlorine present, which can also react with the reducing agent in the gaseous phase. This arrangement makes it possible to increase the production of $ClO_2$ in the main reactor. Compared to solution of recycling via the compressor, this arrangement has the advantage that it does not cause a mixture excessively rich in corrosive gases to pass through the compressor and that it does not re-heat the cold gases issuing from the absorption column, by mixing them with the hot gases issuing from the dechlorination reactor, before they are passed into the compressor.

Figure 3:
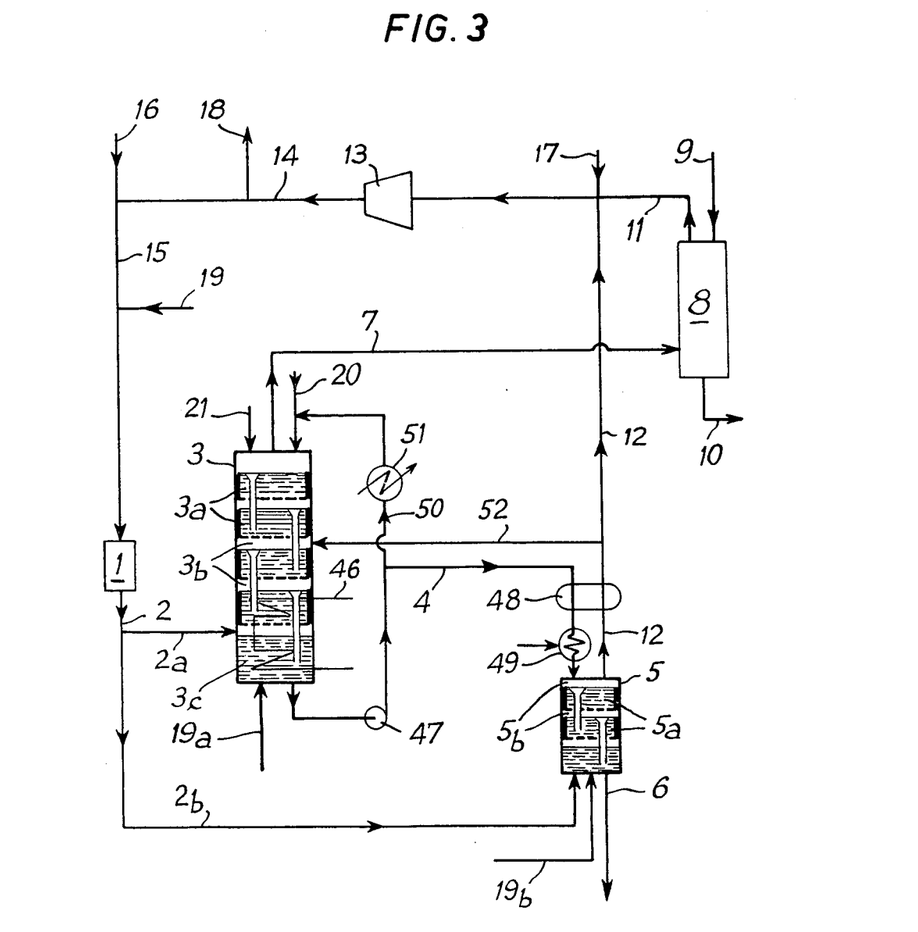
Figure 4:
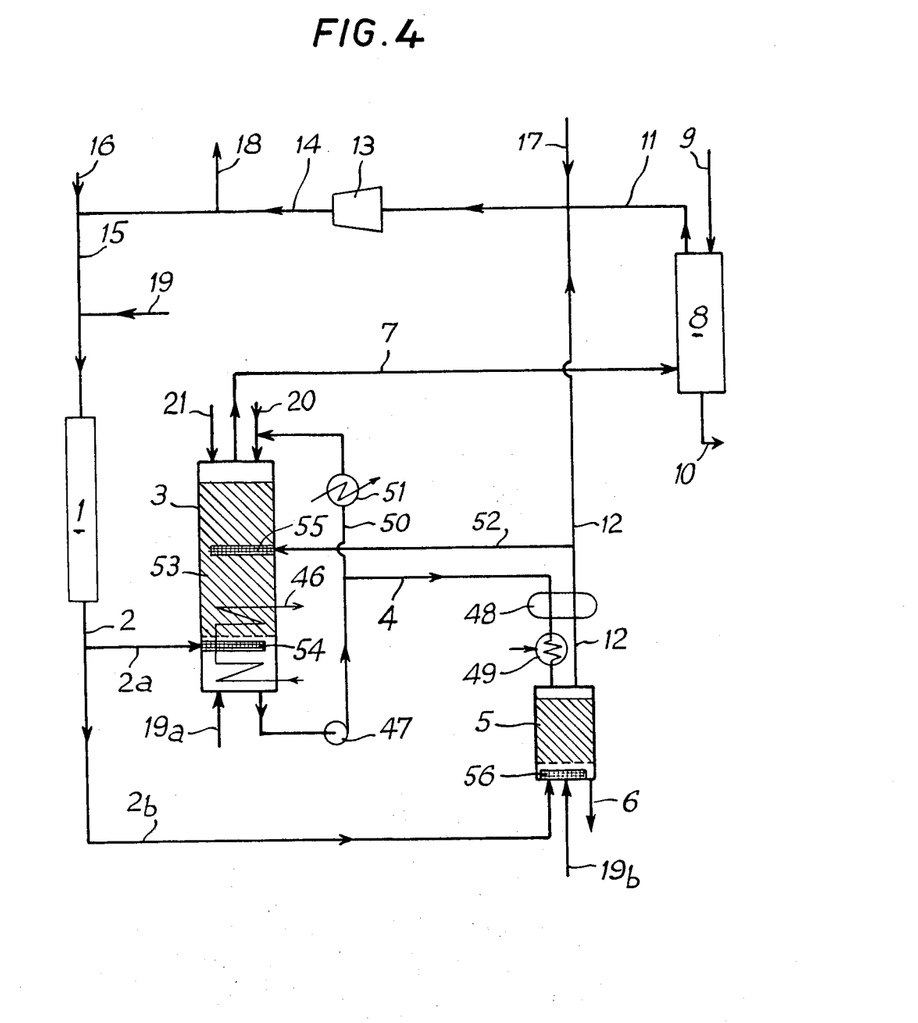

This variant of the process of the invention is described below, with reference to the attached drawings in which:

FIG. 3 is a schematic representation of the industrial installation for carrying out the improved process according to the invention, comprising production and dechlorination reactors of the type of a column with perforated plates and weirs, and FIG. 4 is a variant of the installation of FIG. 1, comprising production and dechlorination reactors of the packed column type.

The installation for the production of chlorine dioxide represented in FIG. 3 comprises an auxiliary reactor 1 of greatly reduced dimensions, for carrying out the reduction of the tail gases recycled through the pipeline 15 (and containing, inter alia, some chlorine) by means of an excess of reducing agent, in this case sulphur dioxide, supplied through the pipeline 19, in the presence of atomised water introduced through the pipeline 16, so as to convert this chlorine to hydrochloric acid in accordance with the reaction:

$$Cl_2 + SO_2 + 2H_2O \rightarrow 2HCl + H_2SO_4 \qquad (4)$$

The greater part of the gaseous effluent issuing from the auxiliary reactor through the pipeline 2 is injected through the pipeline 2a into the bottom of a main reactor 3 where the oxidation-reduction reactions leading to the production of chlorine dioxide take place. This main reactor is of the type of a column with perforated plates 3a and weirs, alternating with interspaces 3b located between the level of one weir and the plate of the stage above it.

The liquid reactants, namely, sulphuric acid and alkali metal chlorate solution (if appropriate mixed with an alkali metal chloride), are introduced at the top of the column through the feed pipelines 21 and 20 respectively and circulate downwards in counter-current to the gaseous reactants (gaseous effluent from the auxiliary reactor, containing HCl and chlorine mixed with an excess of reducing agent) injected into the bottom of the column through the pipeline 2a, above a buffer volume 3c of reaction liquid.

A part of the reducing agent, in the form of pure $SO_2$, can advantageously be introduced into the bottom of the column, at the lower part of the said buffer volume, through the pipeline 19a.

Thus, the plates 3a as well as the buffer volume 3c are filled with reaction liquid and are separated by interspace 3b, filled with gas, above the weirs, and the gases pass through the various layers of reaction liquid in the form of fine bubbles, presenting a large gas-liquid exchange surface.

The chlorine dioxide production reaction takes place in the main reactor 3, within the reaction liquid layers; this is an oxidation-reduction principally between chloride and chlorate in an acid medium, which inter alia produces a certain quantity of chlorine:

$$2HCl + 2HClO_3 \rightarrow 2ClO_2 + Cl_2 + 2H_2O \qquad (2)$$

This reaction takes place in a 7 N to 11 N, preferably 8 N to 10 N, sulphuric acid medium.

The direct reduction of the chlorate by $SO_2$ also takes place within the reaction liquid layers, but can be considered as being a side-reaction:

$$2NaClO_3 + 6SO_2 + 6H_2O \rightarrow 2HCl + 5H_2SO_4 + Na_2SO_4 \qquad (6)$$

because it only occurs if there are insufficient chloride ions present for the reaction (2) between chloride and chlorate to be able to take place normally. In such a case, the chloride ions will be produced by direct reduction of the chlorate by $SO_2$ (reaction 6) until the concentration of chloride ions again becomes sufficient to maintain the production of $ClO_2$ at the desired level. There will be even greater economy in respect of chlorate if a certain amount of chloride (preferably 6% of the chlorate) is introduced with the chlorate solution into the main reactor 3.

Furthermore, the reaction wherein the tail gases (containing, inter alia, chlorine) are reduced by the gaseous reducing agent ($SO_2$), in order to produce HCl, also takes place inside the main reactor 3, at the level of the interspaces 3b between plates, with the said interspaces playing the role of a second auxiliary reactor for the reduction of the tail gases.

The temperature of the mass of reaction liquid can be regulated by a titanium coil 46, fed with cooled water, for example at 5° C, and mounted in the lower part of the column. This coil can also serve to support plates 3a.

The liquid effluent from the main reactor 3, taken from the buffer volume 3c, at a temperature of about 40° C, is delivered by the pump 47:

partly at the top of the secondary dechlorination reactor 5, via the pipeline 4, a gas-liquid heat exchanger 48 and a heater 49, where it is heated to a temperature of about 75° C, and partly at the top of the main reactor 3, via the recycling pipeline 50 and a cooler 51, where it is brought to a temperature of about 25° C, in order to regulate the temperature of the main reactor.

The gaseous effluent, issuing from the top of the main reactor through the pipeline 7, is passed into a packed column 8 sprayed with cooled water supplied through the pipeline 9, in order to absorb the $ClO_2$, present as a product in the said gaseous effluent. The aqueous $ClO_2$ solution is recovered at the outlet of the column 8, through the pipeline 10.

The secondary dechlorination reactor 5 is also of the type of a column with plates 5a and with weirs, the plates being separated from one another by interspaces 5b. A fraction of the gaseous effluent from the auxiliary reactor for reaction 1 is injected through the pipeline 2b and through the bottom of the secondary reactor 5, as is a certain amount of gaseous reducing agent, in the form of pure $SO_2$, introduced separately through the pipeline 19b, so as to achieve optimum dechlorination regulated as a function of the analysis of the residual liquid effluent issuing from the bottom of the said secondary reactor 5 through the pipeline 6.

The reaction wherein the tail gases are reduced by the gaseous reducing agent also takes place at the level of the interspaces 5b.

The gaseous effluent issuing from the top of the secondary reactor 5 through the pipeline 12, substantially in thermal equilibrium with the liquid, say at about 75° C, pass into the heat exchanger 48, in which they are cooled whilst they heat the liquid effluent from the main reactor 3; thereafter, they are:

either mixed with the gaseous effluents issuing from the top of the packed column 8 through the pipeline 11, so as to form the tail gases to be recycled by the compressor 13 via the pipeline 14 and 15 to the auxiliary reduction reactor 1, after addition of a small amount of air or of a neutral gas supplied through the pipeline 17 and/or after withdrawal of a small amount of tail gas through the outlet pipeline 18, or, advantageously recycled through the pipeline 52 directly to the main reactor 3, at a suitable mean level of the latter, so as to equilibrate the pressures; the hydrogen chloride gas contained in the recycled gaseous effluent is absorbed by the reaction liquid, as is the chlorine present in the said recycled gaseous effluent, which can react with the reducing agent in the gas phase; such an arrangement makes it possible to increase the production of chlorine dioxide in the main reactor and not to pass a mixture excessively rich in corrosive gases through the compressor.

By way of example, a semi-industrial installation for the production of chlorine dioxide, as described above and represented in FIG. 1, exhibits the following characteristics:

nominal production capacity 240 kg of $ClO_2$/day,
maximum production capacity 600 kg of $ClO_2$/day,
flow rate of recycled gases 40 to 90 $Nm^3$/hour,
glass column reactor (main production reactor 3):
diameter 600 mm,
liquid height 4 m,
six perforated titanium plates pierced with 200 uniformly distributed holes of 2 mm diameter,
height of liquid above each plate 50 cm,
volume of liquid below the gas inlet 250 l,
total volume of liquid 1.1 $m^3$,
titanium cooling coil, length 18.50 m, comprising six turns in the lower volume and four turns above the first plate, this coil being fed with water cooled to 5° C,
direct recycling of liquid variable between 0 and 2 $m^3$/hour (a minimum permanent recycling of 0.5 $m^3$/hour is recommended), a glass heat exchanger being mounted on the recycling circuit,
mean concentration at the top of the reactor, 80 g of $NaClO_3$/l,
mean concentration at the bottom of the reactor 20 g of $NaClO_3$/l,
feed temperature at the top of the reactor 25° C, and
mean temperature of the liquid at the bottom of the reactor, 40° C.

Secondary reactor (glass column without liquid recycling):
diameter 300 mm,
liquid height 1.25 m,
three perforated titanium plates pierced with 50 uniformly distributed holes of 2 mm diameter,
total volume of liquid 120 l to 180 l,
heating of the solution to 75° C provided by an external exchanger, made of glass, located between the main reactor and secondary reactor and fed with water heated to 90° C, and by electrical resistances within the column,
for a production of 240 kg of $ClO_2$/day:
flow rate of $NaClO_3$ (containing 6% by weight of NaCl), 27 l/hour or 18 kg/hour, and
weight of $H_2SO_4$ required, 16 kg/hour.

The installation shown in FIG. 4 is a variant of that of FIG. 1, from which it differs by the fact that:

the main reactor 3 and the secondary reactor 5 are of the flooded packed column type, 53, witth direct recycling of liquid for the main reactor, the gases are introduced into these reactors through the diffusers 54, 55 and 56 and the reduction of the tail gases is principally effected in the auxiliary reactor 1, which is of normal size.

I claim:

1. In the process for the manufacture of chlorine dioxide which comprises reducing an alkali metal chlorate in an acidic medium by means of a gaseous or liquid reducing agent, in at least one production reaction zone to obtain a liquid effluent and a gaseous effluent, the gaseous effluent containing chlorine dioxide, passing said gaseous effluent through cooled water in a column, and absorbing said chlorine dioxide in said water, recycling the gaseous effluent, referred to as "tail gas" which contains chlorine issuing from said absorption column to said production reaction zone, in order to dilute the chlorine dioxide produced, the improvement which comprises a) contacting said tail gas containing chlorine with an excess of the gaseous or liquid reducing agent, in the presence of water, in an auxiliary reduction zone, thus converting substantially all the chlorine to hydrochloric acid and b) recycling the product from step a) containing hydrochloric acid to said production reaction zone in a recycling circuit.

2. The process according to claim 1, which additionally comprises step (c) wherein a small portion of the reduced tail gas from step (a) is recycled into a secondary reaction zone where it is brought into contact with the liquid effluent from step (b) so as to lower to a minimum the total concentration of chlorine in said liquid effluent, step (d) wherein the gaseous effluent issuing from step (b) and containing chlorine dioxide is brought into contact with cooled water in a packed column, to separate the chlorine dioxide produced in the form of an aqueous solution, step (e) wherein the tail gas consisting of the gaseous effluent issuing from step (d) is subjected to a compression step and is returned to the reduction step (a), step (f) wherein a constant small amount of air or of neutral gases is admitted into the recycling circuit, upstream of the compression step and a small amount of tail gas is withdrawn from the recycling circuit downstream of the compression step.

3. The process according to claim 2 wherein the tail gas from step (d) is combined with the gaseous effluent from step (c).

4. Process according to claim 2 which additionally comprises step (g) continuously analyzing the composition of the solution of $ClO_2$ from step (d) with respect to $ClO_2$ and $Cl_2$ content, thus making it possible to detect any variation in the operation of stages (a), (b) and (d) regulating the temperature in the absorption column in step (d), analyzing the liquid effluent at the outlet of the production step (b) and step (c) and adjusting the flow rates of reducing agent introduced into steps (a) and (b) in accordance with the results from step (g).

5. The process according to claim 4 wherein the water flow rate in step (d) is also regulated.

6. The process according to claim 2, wherein the tail gas is recycled at the rate of 90 to 99.5% into the reduction step (a).

7. The process according to claim 2, wherein in the $ClO_2$ production step (b), the acid is a 7 N – 11 N sulphuric acid solution and the temperature is 25°–60° C.

8. The process according to claim 2, wherein in the $ClO_2$ production step (b) the alkali metal chlorate is in the form of a mixture with an alkali metal chloride in an amount not exceeding 16% relative to the chlorate.

9. The process according to claim 2, wherein step (c) is carried out at a temperature not exceeding 80° C.

10. The process according to claim 2, wherein in step (d) the water is at a temperature of 0° to 10° C.

11. process according to claim 2, wherein the liquid effluent issuing from the bottom of the production reaction zone in step (b) is partly recycled to the upper part thereof in order to dilute the reactants.

12. The process according to claim 11 wherein a buffer volume of reaction liquid is preserved in the lower part of the production reaction zone below the gas inlet, and the liquid effluent to be recycled is taken from the said volume of liquid.

13. The process according to claim 11 wherein the liquid effluent to be recycled is cooled by external means.

14. The process according to claim 11 wherein the lower part of the production reaction zone is cooled by cooling means within the production reaction zone.

15. The process according to claim 11 wherein the gaseous effluent issuing from the secondary reaction zone is recycled to the production reaction zone.

16. The process according to claim 12, wherein a part of the reducing agent is introduced, in the undiluted state, through the bottom of the production reaction zone across said buffer volume of reaction liquid.

17. The process according to claim 16 wherein a part of the reducing agent is introduced in the undiluted state through the bottom of the secondary reaction zone.

18. The process according to claim 15 wherein a heat exchange is carried out between the gaseous effluent from the secondary reaction zone which is to be recycled, and the liquid effluent issuing from the production reaction zone and passing to the secondary reaction zone.

19. The process according to claim 18 wherein the liquid effluent issuing from the production reaction zone and passing to the secondary reaction zone is heated to a temperature of 70° to 80° C.

20. Process according to claim 1, wherein the gaseous reducing agent is sulphur dioxide.

21. Process according to claim 1, wherein the liquid reducing agent is atomised methanol.

22. An apparatus for the production of chlorine dioxide which comprises:
(1) an auxiliary reactor for carrying out the reduction of the tail gas containing chlorine, said reactor being equipped with inlet means for feeding respectively said tail gas, a reducing agent and water and outlet means for the gaseous product,
(2) a main reactor for carrying out the reduction of an alkali metal chlorate with an acid to produce chlorine dioxide, means for introducing therein the gaseous product issuing from the outlet means of said auxiliary reactor through the bottom thereof, the main reactor additionally comprising an alkali metal chlorate solution inlet, an acid inlet,
(3) a secondary reactor equipped with inlet means at the bottom for a portion of the gaseous product issuing from the auxiliary reactor, an inlet means for the liquid effluent issuing from the main reactor, an outlet for discharging the residual liquid, an outlet for the residual gas,
(4) a packed absorption column comprising an inlet for the gaseous effluent issuing from the main reactor, a cooled water inlet, whereby chlorine dioxide is dissolved in water, an outlet for discharging the aqueous chlorine dioxide solution, an outlet for discharging the non-absorbed residual gas,
(5) compressing means for the non-absorbed residual gas issuing from the outlet of the absorption column and means for recycling said compressed gas to the inlet of the auxiliary reduction reactor.

23. The apparatus according to claim 22 additionally comprising means for combining the residual gas issuing from the secondary reactor with the non-absorbed residual gas from the absorption column and feeding the combined gases to said compressing means.

24. The apparatus according to claim 22 additionally comprising means for analyzing the composition of the product from the auxiliary reactor, the main reactor and the secondary reactor.

25. The apparatus according to claim 22 additionally comprising an inlet valve for a dilution gas, and an automatic outlet valve for the tail gas, the valves being provided respectively upstream and downstream from said compressing means.

26. The apparatus according to claim 22 wherein the main reactor is of the "airlift" tank type, comprising means for recirculating the liquid, a diffuser at the bottom of the reactor for the distribution and dispersion of the mixture of tail gas, reducing agent and water, through the liquid mass of alkali metal chlorate solution in an acid medium, a cylindrical chimney partitioning the internal space of the said reactor into two non-sealed concentric compartments and a heat exchanger placed within the reactor, for regulating the temperature of the liquid mass.

27. The apparatus according to claim 22, wherein the main reactor is of the gas-liquid counter-current type.

28. Apparatus according to claim 27 wherein the gasliquid counter-current reactor comprises columns with perforated plates and weirs.

29. Apparatus according to claim 27 wherein the gas liquid countercurrent reactor comprises packed columns.

30. Apparatus according to claim 28 wherein the gas liquid countercurrent reactor comprises both columns with perforated plates and weirs and packed columns.

* * * * *